Aug. 6, 1963

T. G. ROHNER 3,100,279

CONTROL SYSTEM FOR CONTROLLING THE
OPERATION OF SYNCHRONOUS MOTORS

Filed Jan. 8, 1962

INVENTOR.
THOMAS G. ROHNER
BY
Akel C. Benson
ATTORNEY

INVENTOR.
THOMAS G. ROHNER

INVENTOR.
THOMAS G. ROHNER
BY
Akel C. Benson
ATTORNEY

United States Patent Office 3,100,279
Patented Aug. 6, 1963

3,100,279
CONTROL SYSTEM FOR CONTROLLING THE OPERATION OF SYNCHRONOUS MOTORS
Thomas G. Rohner, Minneapolis, Minn., assignor to Electric Machinery Mfg. Company, Minneapolis, Minn., a corporation of Minnesota
Filed Jan. 8, 1962, Ser. No. 164,674
13 Claims. (Cl. 318—167)

The herein disclosed invention relates to control systems for controlling the operation of synchronous motors and particularly for the brushless type of synchronous motor.

An object of the invention resides in providing a control system by means of which all of the operations necessary in starting and stopping a synchronous motor may be performed and in the event of the motor getting out of synchronism, removing field excitation until synchronizing may be again attempted and resynchronizing the motor, all without the use of relays or mechanical switches or other expensive equipment.

Another object of the invention resides in providing a control system by means of which the motor field winding will be shorted or shunted with a low value of field discharge resistance while the motor is at standstill, the motor brought up to synchronizing speed, the short removed from the field winding, the field winding energized and by means of which excitation for the field winding will be removed in the event of overload or drop in voltage causing the motor to pull out of synchronization, and the field winding again shorted and by means of which the starting of the motor will be again attempted when the conditions causing the motor to get out of synchronism have been removed and by means of which no energy is consumed by the control system when the motor has been disconnected.

A still further object of the invention resides in providing a system by means of which the field-winding circuit and the control circuitry therefor may be carried by the rotor of the motor thereby utilizing the invention in a brushless synchronous motor.

An object of the invention resides in providing a system by means of which the field winding circuit is opened and closed by means of a silicon-controlled rectifier.

Another object of the invention resides in providing a control circuit operating in conjunction with the gate of said silicon-controlled rectifier and utilizing a second silicon-controlled rectifier.

A still further object of the invention resides in arranging the components of said control circuit in the form of a bridge.

Other objects of the invention reside in the novel combination and arrangement of parts and in the details of construction hereinafter illustrated and/or described.

Figure 1:
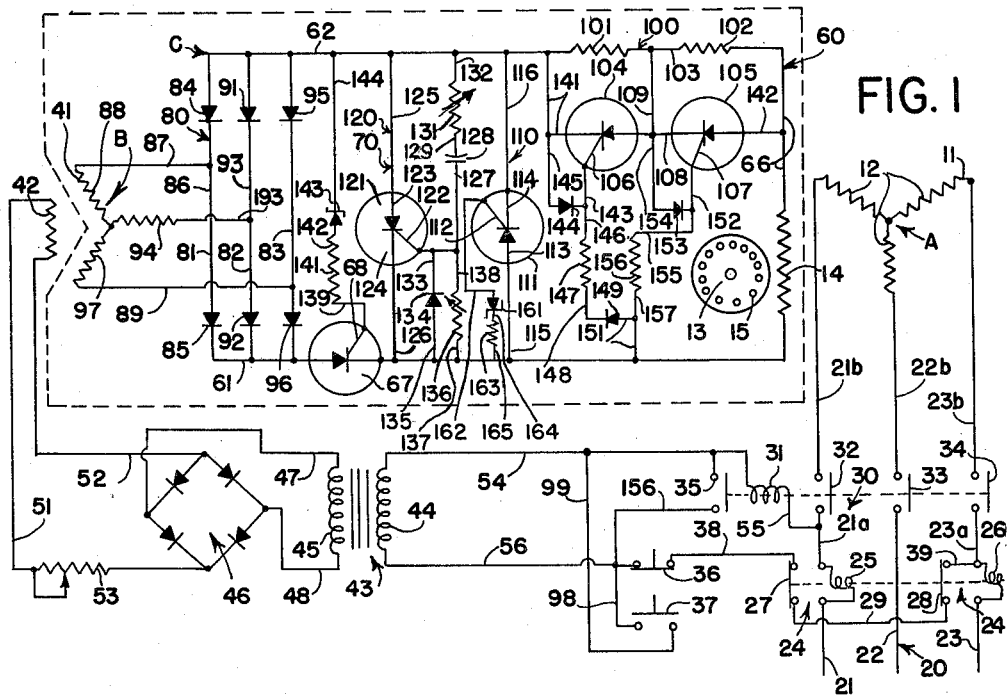
FIG. 1 is a wiring diagram of a synchronous motor illustrating a control therefor incorporating an embodiment of the invention.

The invention has been disclosed in FIG. 1 in conjunction with a three-phase synchronous motor A having a stator 11 provided with three-phase windings 12 connected in V. Operating in conjunction with the stator 11 is a rotor 13 having a field winding 14. This rotor also has amortisseur windings 15 used in starting the motor and accelerating the same up to synchronizing speed. The motor A is energized from a three-phase power line 20 having three conductors 21, 22 and 23.

Energization of the motor A is procured through overload relays 24 and a line switch 30. The relays 24 include coils 25 and 26 and normally closed switches 27 and 28 operated thereby. Line switch 30 includes a coil 31 and four normally open switches 32, 33, 34 and 35 operated thereby. In addition a normally closed stop push button 36 and a normally open run push button 37 are employed.

The conductors 21 and 23 are connected to coils 25 and 26 of overload relays 24 while conductor 22 is connected to switch 33 of line switch 30. The coils 25 and 26 of overload relays 24 are further connected by means of conductors 21a and 23a to the switches 32 and 34 of line switch 30. The switches 32, 33 and 34 of said line switch are connected by means of conductors 21b, 22b and 23b to the windings 12 of motor A.

The field winding 14 of motor A is energized from a three-phase exciter B. This exciter includes a three-phase winding 41 which is mounted on the rotor 13. The said exciter also includes an exciter field winding 42 which is mounted on the stator 11. The exciter field winding 42 is energized from a transformer 43 which has a primary winding 44 and a secondary winding 45. The secondary winding 45 is connected to a full-wave rectifier 46 by means of conductors 47 and 48. Direct current derived from the rectifier 46 is fed to the field winding 42 by means of conductors 51 and 52. A rheostat 53 is connected in the conductor 51 and controls the current in said field winding.

The primary 44 of transformer 43 has connected to it a conductor 54 which in turn is connected to switch 35 and to one end of the coil 31 of line switch 30. The other end of this coil is connected by means of a conductor 55 to the conductor 21a. The other end of the primary 44 is connected by means of a conductor 56 to the stop push button 36 which in turn is connected by means of a conductor 38 to switch 27. Switch 27 is connected by means of a conductor 29 to switch 28 which in turn is connected by means of a conductor 39 to conductor 23a. Push button 37 is connected by means of a conductor 98 to conductor 56 and is connected by means of another conductor 99 to conductor 54. Conductor 56 is connected to another conductr 156 which in turn is connected to the other side of switch 35.

The control system for the motor which embodies the instant invention is indicated in its entirety by the reference character C and comprises field excitation circuitry 60 for the field winding 14 and control circuitry 70 therefor.

The field excitation circuitry 60 includes two busses 61 and 62, of which the bus 62 is connected to a field winding discharge resistor circuit 100 and by means of a conductor 66 to one end of the field-winding 14. The other bus 61 is connected to a silicon controlled rectifier 67 which has a gate 68. This rectifier is further connected by means of a conductor 69 to the other end of the field winding 14.

The busses 61 and 62 are fed from the output of the exciter B by means of a three-phase full-wave rectifier 80. This rectifier consists of three sections, 81, 82 and 83, which are similar in construction. The section 81 includes a first rectifier 84 connected to the bus 62 and a second rectifier 85 connected to the bus 61. The two rectifiers are connected together by means of a conductor 86. Another conductor 87 connects one phase winding 88 of the winding 41 to the conductor 86. The section 82 similarly comprises rectifiers 91 and 92 which are connected together by means of a conductor 93 which in turn is connected to the second phase winding 94 of the winding 41 by means of a conductor 193. Again, the section 83 includes rectifiers 95 and 96 which are connected to the third phase winding 97 of the winding 41 by means of a conductor 89. The three sections 81, 82 and 83 are connected across the busses 61 and 62 and together deliver rectified pulses to the said busses providing substantially uniform direct current.

The field-winding control circuit 70 includes a positive discharge circuit 110 and a negative discharge circuit 120. The positive discharge circuit 110 comprises a silicon controlled rectifier 111 having a gate 112, an anode 113, and a cathode 114. Anode 113 is connected by means of a conductor 115 to conductor 69 while cathode 114 is connected by means of a conductor 116 to bus 62. To control the break-over point of silicon controlled rectifier 111 a Zener diode 161 is employed which is connected to the gate 112 of silicon controlled rectifier 111 by means of a conductor 162. This diode is further connected to a resistor 163 by means of a conductor 164. Resistor 163 is connected to conductor 69 by a conductor 165.

The negative discharge circuit 120 includes a silicon controlled rectifier 121 having a gate 122, an anode 123 and a cathode 124. Anode 123 is connected by means of a conductor 125 to bus 62 and cathode 124 is connected by means of a conductor 126 to conductor 69. Gate 122 is connected by means of a conductor 127 to a capacitor 128. This capacitor is in turn connected by means of a conductor 129 to a variable resistor 131 which is connected by means of a conductor 132 to the bus 62. Conductor 127 is connected to a conductor 133 which is connected to a diode 134. This diode is connected by a conductor 135 to conductor 69. Diode 134 is shunted by a variable resistor 136 which is connected to the conductors 69 and 127 by means of conductors 137 and 138.

The gate 68 of silicon controlled rectifier 67 is connected by means of a conductor 139 to a resistor 141. This resistor is connected by means of a conductor 142 to a Zener diode 143. Diode 143 is connected by means of a conductor 144 to bus 62.

The field winding discharge circuit 100 further comprises two resistances 101 and 102 connected in series by means of a conductor 103. Resistor 101 is connected to bus 62 and resistor 102 is connected to conductor 66 leading from the motor field winding 14. In addition two silicon controlled rectifiers 104 and 105 are employed having gates 106 and 107. These rectifiers are connected in series by means of a conductor 108 which in turn is connected to conductor 103 by means of a conductor 109. The rectifier 104 is further connected by means of a conductor 141 to the bus 62 and the rectifier 105 is further connected to the conductor 66 by means of a conductor 142. The gate 106 of rectifier 104 is connected by means of a conductor 143 to a rectifier 144 which in turn is connected by means of a conductor 145 to the conductor 141 and thus to bus 62. Conductor 143 is connected to another conductor 146, which in turn is connected to a resistor 147. This resistor is further connected by means of a conductor 148 to a rectifier 149 which in turn is connected by another conductor 151 to conductor 69. The gate 107 of silicon controlled rectifier 105 is connected by means of a conductor 152 to a rectifier 153. This rectifier is further connected by means of a conductor 154 to conductor 109 and thus to conductor 103. A conductor 155 is connected to conductor 152 and to a resistor 156 which in turn is connected by means of a conductor 157 to conductor 151 and thus to conductor 69.

The operation of the invention is as follows:

A synchronous motor, during the acceleration period, is essentially a transformer with a stator winding serving as a primary and with two rotating windings serving as secondaries. One of the secondaries is the amortisseur winding. At standstill and at all speeds below synchronous speed, a current is induced in the shorted bars of the amortisseur winding which produces a magnetic field interacting with the rotating magnetic field set up by the stator winding and which thereby produces torque causing rotation of the rotor. The other secondary winding of the transformer is the motor field winding which is carried by and rotates with the rotor. Similarly, current is produced in the field-winding circuit which produces additional torque also causing rotation of the rotor. As the voltage is applied to the primary of the transformer, namely the stator winding, a voltage is also induced in the field winding. At standstill, the frequency of the induced field voltage, namely the motor slip frequency, is line frequency, which is assumed to be 60 cycles per second for the sake of explanation. As the rotor accelerates in speed, the frequency decreases inversely proportionately to the speed. At standstill and with the field-winding circuit open, the induced voltage across the field winding is so great that it becomes necessary to short the field winding through a suitable field discharge resistor in order to protect the insulation on the field winding. During rotation of the rotor an alternating voltage is induced in the field-winding consisting of alternating positive and negative pulses. The positive pulses are those where the potential at conductor 69 is positive with respect to that at conductor 66 and the negative pulses are those where the potential at conductor 69 is negative with respect to that at conductor 66. When the pulses are positive, the discharge path is through the positive discharge circuit 110 and the current flows from conductor 69 through conductor 115, silicon controlled rectifier 111, and conductor 116, to bus 62. When the pulses are negative, the discharge path is through the negative discharge circuit 120 and current flows from bus 62 through conductor 125, the silicon controlled rectifier 121 and conductor 126 to conductor 69. In order that current may flow through these discharge paths, the silicon controlled rectifier 111 must be turned on for each positive pulse, and the silicon controlled rectifier 121 must be turned on for each negative pulse. The voltage of the positive pulse is sufficiently great to cause breakover with zero gate voltage, so that the discharge is definitely effected when the pulses are positive. When the pulses are negative, the flow of current through the silicon controlled rectifier 120 is controlled by the gate current of said rectifier.

While the induced field-winding current is great it is requisite that no excitation current flow. To procure this result, it is necessary that no gate current flow through the gate 68 of silicon controlled rectifier 67. For this purpose the Zener diode 143 is employed which blocks the flow of current through gate 68 until the voltage across the same reaches a predetermined value. The value of this voltage is held below firing voltage in the following manner. The gate circuit through gate 122 controls the anode-to-cathode voltage at which the silicon controlled rectifier 121 begins to conduct. This voltage is impressed across gate circuit of silicon controlled rectifier 67 and if it exceeds the Zener voltage, current commences to flow through the Zener diode 143, the maximum current being controlled by resistor 141. The impedance is low as compared to the impedance of capacitor 128 so that the current flow is largely controlled by the action of said capacitor. Since the impedance of a capacitor at high frequency is lower than at low frequencies, current flows through the gate circuit of silicon controlled rectifier 121, when the motor slip frequency is the greatest. Under such conditions the voltage across the Zener diode 143 produced by silicon controlled rectifier 121 is less than the Zener voltage and the silicon controlled rectifier 67 does not fire. As the slip frequency of the motor field winding decreases, the current flow also decreases and a higher anode-to-cathode voltage occurs. When the slip frequency is low enough the anode-to-cathode voltage of silicon controlled rectifier 121 exceeds the Zener voltage and current flows through the gate circuit of silicon controlled rectifier 67 and which causes said silicon controlled rectifier to conduct field excitation current. At the time that silicon controlled rectifier 67 is turned on, no current flows through the field winding discharge circuit including conductor 115, silicon controlled rectifier 111 and conductor 116 to bus 62 because the excitation voltage is less than the breakover voltage of said rectifier. Since excitation produces a positive voltage at conductor 69, current cannot flow through the silicon controlled rectifier 121 as a reverse voltage will be applied to silicon controlled rectifier 121.

For protection of the gate of silicon controlled rectifier 121 from a destructive reverse voltage, diode 134 is employed. Resistor 131 and 136 may be used for adjustment of the synchronizing point of the motor.

If for reason of overload, voltage dip or other reasons, the motor pulls out of synchronism, then the field excitation current is removed and the field winding discharge circuit is reestablished in the following manner. During normal motor operation, silicon controlled rectifier 67 conducts current and silicon controlled rectifier 111 blocks the flow of current through it. As soon as the motor pulls out of sychronism, a positive pulse of voltage is produced in the field winding in positive discharge circuit 110 which is greater than the excitation voltage. This reverses the voltage across silicon controlled rectifier 67 and causes it to block the flow of current therethrough. Excitation current hence ceases to flow. As the positive pulse of voltage increases it reaches the breakover voltage for silicon controlled rectifier 111 and this controlled rectifier conducts and discharge of field current occurs as previously described. When the pulse is negative the alternate discharge circuit 120 functions as previously described.

Figure 2:
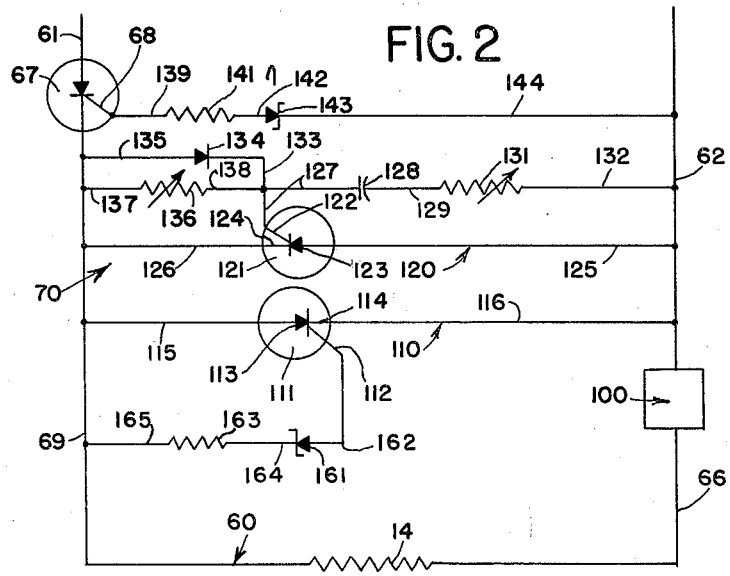
FIG. 2 is a wiring diagram illustrating the control itself incorporating only the rudimentary elements and showing the same arranged in a simplified form for ready explanation of the operation of the invention.
Figure 3:
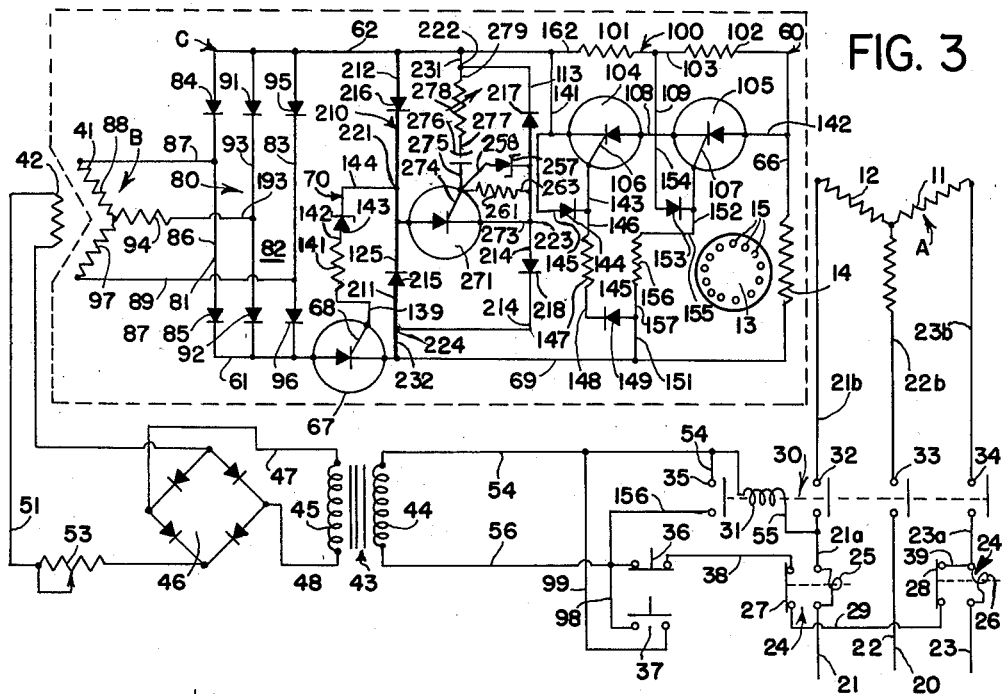
FIG. 3 is a view similar to FIG. 1 of a modification of the invention.
Figure 4:
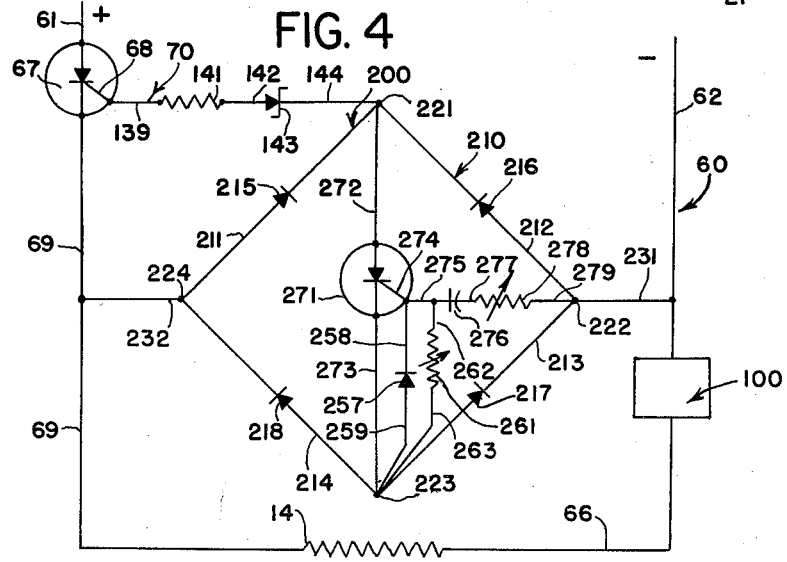
FIG. 4 is a view similar to FIG. 2 of the modification shown in FIG. 3.

The form of the invention shown in FIGS. 3 and 4 is quite similar to that shown in FIGS. 1 and 2 and the same reference numerals will be used to designate the identical parts. Different structure will, however, be designated by reference numerals beginning with the digit 2.

The field-winding discharge circuit in the form of the invention shown in FIGS. 4 and 3 is indicated by the reference numeral 200 and includes a bridge circuit 210, provided with four legs 211, 212, 213, and 214. In these legs are disposed rectifiers 215, 216, 217 and 218. The juncture between the legs 211 and 212 is designated by the reference numeral 221, that between the legs 212 and 213, 222, that between the legs 213 and 214, 223, that between the legs 214 and 211, 224. Zener diode 143 is connected by means of the conductor 144 to the juncture 221 of bridge circuit 210. Juncture 222 of said bridge circuit is connected by means of a conductor 231 to the bus 62. Juncture 224 of the bridge 210 is connected by means of a conductor 232 to the conductor 69 leading from silicon controlled rectifier 67.

The control circuitry 70 includes a second silicon controlled rectifier 271 which is connected across the two junctures 221 and 223 of bridge 210 by means of conductors 272 and 273. This controlled rectifier has a gate 274 which is connected by means of a conductor 275 to a capacitor 276. This capacitor is in turn connected to an adjustable resistor 278 by means of a conductor 277. Resistor 278 is connected by means of a conductor 279 to juncture 222 of the bridge and which is connected to bus 62 by conductor 231. A diode 257 is connected by means of conductors 258 and 259 to the gate 274 of silicon controlled rectifier 271 and to the puncture 223 of bridge 210. An adjustable resistor 261 is connected by means of conductor 262 and 263 to gate 274 of silicon controlled rectifier 271 and to juncture 223 of bridge 210.

The operation of this form of the invention is as follows:

The circuit shown in FIGS. 3 and 4 utilizes a single silicon controlled rectifier 271 in place of the two rectifiers 111 and 121 of the other form of the invention. The discharge paths for both the positive pulses and the negative pulses include this rectifier. The path for the positive pulses passes current from conductor 69, through conductor 232, leg 211 of bridge 210, conductor 272 through silicon controlled rectifier 271, conductor 273, leg 213 of said bridge and conductor 231, to bus 62. When the pulses are negative the discharge path passes current from bus 62 through conductor 231, leg 212 of bridge 210, conductor 272, silicon controlled rectifier 271, conductor 273, leg 214 of said bridge, and conductor 232, to conductor 69. In order that current may flow through these discharge paths the silicon controlled rectifier must be turned on for each pulse (both positive and negative). The voltage of the positive pulses is sufficiently high to cause break-over with zero gate current so discharge is definitely effected when the pulses are positive. When the pulses are negative, flow of current through the silicon controlled rectifier is controlled by the gate current of rectifier 271 in the same manner as for rectifier 121 so that when the slip frequency is low enough the voltage across the Zener diode 143 exceeds the Zener voltage and silicon controlled rectifier 67 conducts and normal field excitation occurs.

Figure 5:
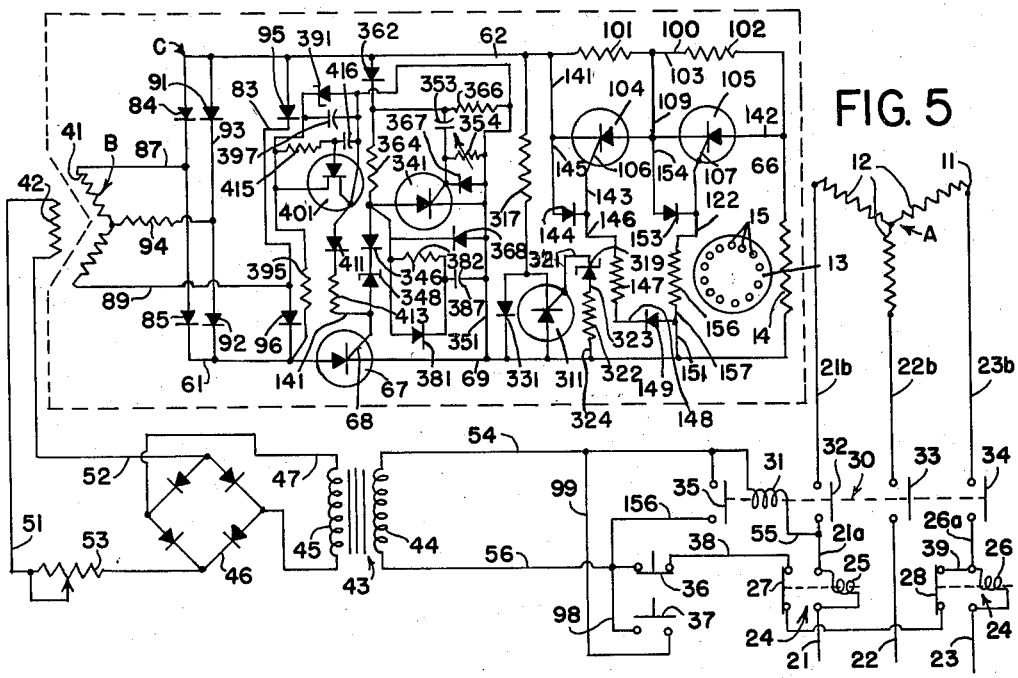
FIG. 5 is a view similar to FIG. 1 of still another form of the invention.
Figure 6:
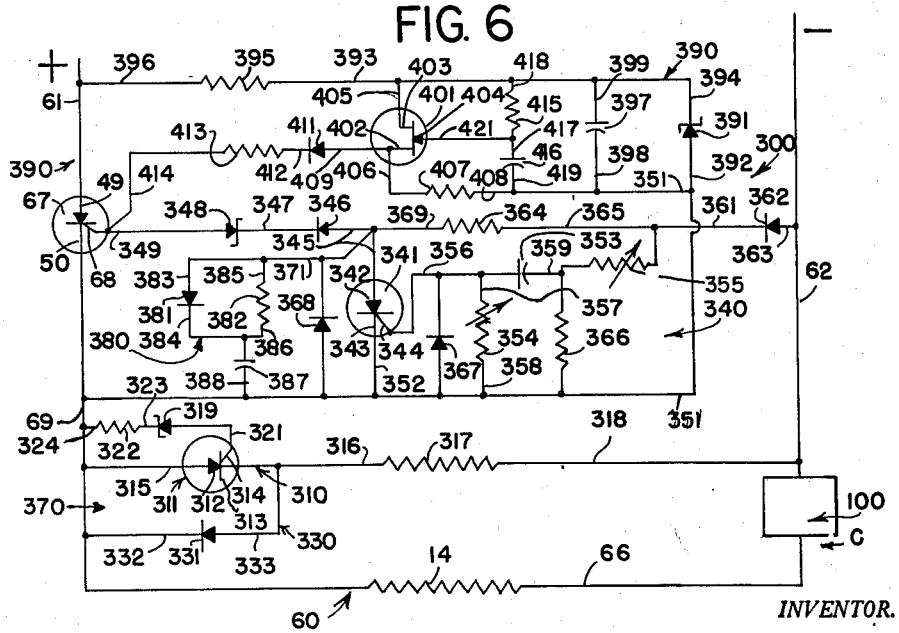
FIG. 6 is a view similar to FIG. 2 of the form of the invention shown in FIG. 5.

The form of the invention shown in FIGS. 5 and 6 is similar to that shown in FIGS. 3 and 4 and the identical parts will not be described again and the same reference numerals will be used to designate these parts. Different structures will however be designated by reference numerals beginning with the digits 3 and 4.

In the form of the invention shown in FIGS. 5 and 6, the positive pulse discharge circuit is indicated by the reference numeral 310, and the negative discharge circuit by the reference numeral 330. In addition separate circuitry referred to as the firing circuitry of the invention is employed for firing silicon controlled rectifier 67 which is designated by the reference numeral 300. This circuitry includes a frequency sensitive circuit 340 and a zero slip circuit 390. These circuits will now be described in detail.

The circuit 310 includes a silicon controlled rectifier 311 having an anode 312, a cathode 313, and a gate 314. The anode 312 is connected by a conductor 315 to the conductor 69. The cathode 313 is connected by means of a conductor 316 to a resistor 317. This resistor is connected by means of a conductor 318 to bus 62. The gate 314 of silicon controlled rectifier 311 is connected to a Zener diode 319 by means of a conductor 321. This diode is connected to a resistor 322 by means of a conductor 323. Said resistor is further connected to conductor 69 by means of a conductor 324.

The negative pulse discharge circuit 330 includes a rectifier 331 which is connected to conductor 69 by means of a conductor 332 and is further connected to conductor 316 by means of a conductor 333. Resistor 317 is common to both the positive discharge circuit 310 and to the negative discharge circuit 330.

The frequency sensitive circuit 340 includes a silicon controlled rectifier 341 having an anode 342, a cathode 343, and a gate 344. Anode 342 is connected to gate 68 of silicon controlled rectifier 67 through a conductor 345, a diode 346, a conductor 347, a Zener diode 348, and a conductor 349. The cathode 343 of silicon controlled rectifier 341 is connected to a bus 351 by means of a conductor 352. Bus 351 is directly connected to conductor 69. The frequency sensitive circuit in addition includes a capacitor 353 and two variable resistors 354 and 355. The gate 344 of silicon controlled rectifier 341 is connected to one terminal of capacitor 353 by means of a conductor 356. Resistor 354 is connected to conductor 356 by means of a conductor 357 and to bus 351 by means of a conductor 358. Capacitor 353 is connected by means of a conductor 359 to a variable resistor 355. This resistor in turn is connected by means of a conductor 361 to a diode 362 which is connected to bus 62 by a conductor 363. The resistor 355 is further connected to a fixed resistor 364 by means of a conductor 365. This resistor is connected by means of a conductor 369 to conductor 345 which leads from the anode 342 of silicon controlled rectifier 341. In order to discharge capacitor 353 a discharge resistor 366 is employed which is connected to conductor 359 and bus 351. A clamping diode 367 is employed for preventing an inverse gate voltage on gate 344 of silicon controlled rectifier 341. This diode is connected to conductor 356 and the bus 351. A second clamping diode 368 similarly protects the gate 68 of silicon controlled rectifier 67. This diode is connected to conductor 371 and is further connected to bus 351.

In conjunction with the frequency sensitive circuit 340 a spurious pulse filter 380 is employed which absorbs spurious signals produced by silicon controlled rectifier 341. This circuit includes a diode 381 and a resistor 382 which are connected in parallel by means of conductors 383, 384, 385 and 386. Conductors 383 and 385 are connected to the anode of silicon controlled rectifier 341 while conductors 384 and 386 are connected to a capacitor 387. This capacitor is connected by means of a conductor 388 to bus 351.

It frequently happens that a synchronous motor will pull in step through reluctance torque. In such case the frequency sensitive circuit may not find a negative pulse of sufficiently low slip to fire the silicon controlled rectifier 67. To overcome this difficulty the zero slip circuit 390 is employed. This circuit includes a Zener diode 391 connected to bus 351 by means of a conductor 392 and to another bus 351 by means of a conductor 394. Bus 393 is connected to one end of a resistor 395, the other end of which is connected by means of a conductor 396 to bus 61. A capacitor 397 is connected by means of conductors 398 and 399 to busses 392 and 393. The circuit 390 includes a unijunction transistor 401 having bases number one and two indicated by the reference numerals 402 and 403 and an emitter 404. Base 403 is connected by a conductor 405 to bus 393. Base 402 is connected by a conductor 406 to a resistor 407 which in turn is connected by a conductor 408 to bus 351. Base 402 is also connected by means of a conductor 409 to a diode 411 which is connected by means of a conductor 412 to a resistor 413. This resistor is connected by means of a conductor 414 to the gate 68 of silicon controlled rectifier 67. A resistor 415 is connected to a capacitor 416 by means of a conductor 417. Resistor 415 is further connected by means of a conductor 418 to bus 393. Capacitor 416 is further connected by means of a conductor 419 to bus 351. The emitter 404 of unijunction transistor 410 is connected by means of a conductor 421 to conductor 417.

The operation of the form of the invention shown in FIGS. 5 and 6 is as follows:

The field-winding control circuit of this form of the invention is indicated by the reference numeral 370 and includes the positive discharge circuit 310 and a negative discharge circuit 330 and the separate firing circuitry 300.

When the induced field pulses of the motor are positive the discharge path is through the positive discharge circuit 310, and current flows from conductor 69 through conductor 315, silicon controlled rectifier 311, conductor 316, resistor 317 and conductor 318 to bus 62. When the pulses are negative, the discharge path is through the negative discharge circuit 330 and current flows from bus 62 through conductor 318, resistor 317, conductor 316, conductor 333, diode 331 and conductor 332 to conductor 69. In order that current may flow through these discharge paths the silicon controlled rectifier 311 must be turned on for each positive pulse, and diode 331 conducts the negative pulses. The voltage of the positive pulses is great enough to cause break over with zero gate voltage so that discharge is definitely effected when the pulses are positive. When the pulses are negative the diode 331 conducts in the forward direction. The alternating pulses in circuits 310 and 330 produce an alternating voltage across resistor 317 which is utilized to actuate the firing circuit.

While the induced field-winding current is being discharged it is requisite that no excitation current flow. To procure this result, it is necessary that no gate current flow through the gate 68 of silicon controlled rectifier 67. For this purpose the Zener diode 348 is employed which blocks the flow of current through gate 68 until the voltage across the same reaches a predetermined value. The value of this voltage is held below firing voltage in the following manner. The gate circuit through gate 344 controls the anode-to-cathode voltage at which the silicon controlled rectifier 341 begins to conduct. This voltage is impressed across gate circuit of silicon controlled rectifier 67 and if it exceeds the Zener voltage, current commences to flow through the Zener diode 348, the maximum current being controlled by resistor 364. The impedance of resistor 355 is low as compared to the impedance of capacitor 353 so that the current flow is largely controlled by the action of said capacitor. Since the impedance of a capacitor at high frequencies is lower than at low frequencies, current flows through the gate circuit of silicon controlled rectifier 341, when the motor slip frequency is the greatest. Under such conditions, the voltage across the Zener diode 348 produced by silicon controlled rectifier 341 is less than the Zener voltage and silicon controlled rectifier 67 does not fire. As the slip frequency of the motor field winding decreases, the current flow also decreases and a higher anode-to-cathode voltage occurs. When the slip frequency is low enough the anode-to-cathode voltage of silicon controlled rectifier 341 exceeds the Zener voltage and current flows through the gate circuit of silicon controlled rectifier 67 and which causes said silicon controlled rectifier to conduct field excitation current. At the time that silicon controlled rectifier 67 is turned on, no current flows through field winding discharge circuit 310 because the excitation voltage is less than the breakover voltage of silicon controlled rectifier 311. Since excitation produces a positive voltage at conductor 69, current cannot flow through the rectifier 331 as a reverse voltage will be applied to rectifier 331.

For protection of the gate of silicon controlled rectifier 341, from a destructive reverse voltage, diode 367 is employed. Resistors 354 and 355 may be used for adjustment of the synchronizing speed of the motor.

If for reason of overload, voltage dip or other reasons, the motor pulls out of synchronism, then the field excitation current is removed and the field winding discharge circuit is reestablished in the following manner. During normal motor operation, silicon controlled rectifier 67 conducts current and silicon controlled rectifier 311 blocks the flow of current through it. As soon as the motor pulls out of synchronism, a positive pulse of voltage is produced in the field winding which is greater than the excitation voltage. This reverses the voltage across silicon controlled rectifier 67 and causes it to block the flow of current therethrough. Excitation current hence ceases to flow. As the positive pulse of voltage increases it reaches the break-over voltage for silicon controlled rectifier 311 and this silicon controlled rectifier conducts, and discharge of field current occurs as previously described. When the pulse is negative the alternate discharge circuit 330 functions as previously described.

As the induced voltage decays at the end of each negative discharge pulse a value of current through silicon controlled rectifier 341 and resistor 364 which is less than the minimum holding current of said controlled rectifier flows. When this occurs said controlled rectifier blocks the further flow of current through this circuit and therefore the remainder of the discharge voltage appears across silicon controlled rectifier 341. This voltage may be of sufficient magnitude to trigger silicon controlled rectifier 67. To prevent this, the spurious pulse filter 380 is added to limit the voltage of such pulses to a value below the Zener voltage of Zener diode 348.

The operation of the zero slip circuit 390 is as follows:

While the field winding current is being discharged the voltage across silicon controlled rectifier 67 is the algebraic sum of the exciter voltage and the voltage between conductor 69 and bus 62. Whenever the resultant is such that the anode 49 of silicon controlled rectifier 67 is positive with respect to the cathode 50 energy is supplied to the zero slip circuit through the combination of the dropping resistor 395 and the Zener diode 391. Whenever the resultant is such that the cathode 50 is positive with respect to the anode 49 of silicon controlled rectifier 67 no energy is supplied to the zero slip circuit because the voltage-drop across the Zener diode 391 in the forward direction is essentially zero. During each period when the energy is being suplied the capacitor 416 is charged through resistor 415. If the period of charging is long enough the capacitor voltage will rise to a value sufficiently high to trigger the unijunction transistor 401 thereby discharging said capacitor 416 through the resistor 407 and through the gate circuit of the silicon controller rectifier 67 comprising the diode 411, the resistor 413 and the gate 68. This pulse of energy will be sufficient to turn on the silicon controlled rectifier 67. The timing period established by the resistor 415, capacitor 416, and the unijunction transistor 401 is adjusted so it will be longer than the longest negative half cycle of discharge energy and therefore the silicon controlled rectifier 67 is not triggered by this circuit until after the machine is in synchronism and then only if the silicon controlled rectifier 67 is blocking the excitation voltage. Each time the voltage between bus 393 and bus 351 drops to zero the unijunction transistor 401 discharges capacitor 416 and therefore the circuit is reset at the end of each negative pulse. The capacitor 397 delays the reset until after the voltage on silicon controlled rectifier 67 has reversed and therefore the pulses generated by this resetting cannot trigger said silicon controlled rectifier.

Changes in the specific form of the invention as herein described, may be made within the scope of the appended claims without departing from the spirit and scope of the invention.

Having described the invention, what is claimed as new and desired to be secured by Letters Patent is:

1. A control device for synchronous motors having a field-winding discharge circuit and a field-winding excitation circuit, said control device including a semiconductor in said excitation circuit and normally inoperative to maintain said circuit open, means including a second semiconductor in said discharge circuit and normally closing the discharge circuit to discharge the negative half cycle of the induced field-winding slip-frequency current, said second semiconductor controlling the actuation of said first semiconductor and maintaining said excitation circuit open while the discharge circuit is closed, and means dependent upon the slip frequency of said current for causing said second semiconductor to actuate said first semiconductor and to open said discharge circuit when the slip frequency reaches a predetermined low value.

2. A control device for synchronous motors having a field-winding discharge circuit and a field-winding excitation circuit, said control device including a semiconductor in said excitation circuit and normally inoperative to maintain said circuit open, semiconductor means in said discharge cricuit and normally providing separate paths for the discharge of the positive and negative pulses of the slip-frequency current, said semi-conductor means controlling the action of said first semiconductor and maintaining said excitation circuit open while the discharge circuit is closed, and means dependent upon the slip frequency of said current for causing said semiconductor means to actuate said first semiconductor and to open said discharge circuit when the slip frequency reaches a predetermined low value.

3. A control device for synchronous motors having a field-winding discharge circuit and a field-winding excitation circuit, said control device including a semiconductor in said excitation circuit and normally inoperative to maintain said excitation circuit open, said field-winding discharge circuit including a branch for discharging positive pulses of the slip-frequency current and another branch for discharging the negative pulses of the slip-frequency current, the voltage at one of said branches controlling the operation of said semiconductor and maintaining said excitation circuit open while the discharge circuit is closed, and means dependent upon the slip frequency of said current for modifying the voltage at the denoted branch to actuate said semiconductor and to open said discharge circuit when the slip frequency reaches a predetermined low value.

4. A control device for synchronous motors having a field-winding discharge circuit and a field-winding excitation circuit, said control device including a semiconductor in said excitation circuit and normally inoperative to maintain said excitation circuit open, said field-winding discharge circuit including a branch for discharging positive pulses of the slip-frequency current and another branch for discharging the negative pulses of the slip-frequency current, a second semiconductor in one of said branches conducting the positive pulses, a third semiconductor in the other path and conducting the negative pulses and means associated with said third semiconductor and dependent upon the slip frequency of said current for causing said third semiconductor to actuate said first semiconductor and to open said discharge circuit when the slip frequency reaches a predetermined low value.

5. A control device for synchronous motors having a field-winding discharge circuit and a field-winding excitation circuit, said control device including a first controlled rectifier having an anode, a cathode and a gate, said anode and cathode being connected in said excitation circuit and normally maintaining said excitation circuit open, a Zener diode, said gate being connected thereto, said discharge circuit having two branches, a second controlled rectifier having an anode, a cathode and a gate, said anode and cathode being common to both branches, rectifying means in one of said branches for conducting positive slip-frequency current pulses, rectifying means in the other branch for conducting negative slip-frequency current pulses, the anode of said second controlled rectifier being connected to said Zener diode, a gate circuit for said second controlled rectifier energized by the slip-frequency and a reactance in said gate circuit.

6. A control device for synchronous motors having a field-winding discharge circuit and a field-winding excitation circuit, said control device including a first controlled rectifier having an anode, a cathode and a gate, said anode and cathode being connected in said excitation circuit and normally maintaining said excitation circuit open, a Zener diode, said gate being connected thereto, said discharge circuit having two branches, a second controlled rectifier having an anode, a cathode and a gate, said anode and cathode being common to both branches, rectifying means in one of said circuits for conducting positive slip-frequency current pulses, rectifying means in the other branch for conducting negative slip-frequency current pulses, the anode of said second controlled rectifier being connected to said Zener diode, a gate circuit for said second controlled rectifier energized by the slip frequency of said current and a capacitor in said gate circuit.

7. A control device for synchronous motors having a field-winding discharge circuit and a field-winding excitatation circuit having a positive conductor and a negative conductor, said control device including a first controlled rectifier having an anode, a cathode and a gate, said anode and cathode being connected in the positive conductor of said excitation circuit and normally maintaining said excitation circuit open, a Zener diode connected at one end to, said gate at its other end to said negative conductor, said discharge circuit having two branches, a second controlled rectifier having an anode, a cathode, and a gate, said anode and cathode being connected in one of said branches to said conductors and conducting positive slip-frequency current pulses, a third controlled rectifier having an anode, a cathode and a gate, said anode and cathode being connected in said second branch to said conductors and conducting negative slip-frequency current pulses, a gate circuit connected to the gate of said last-named controlled rectifier and to said negative conductor and energized by the negative slip-frequency current pulses, and a reactance in the gate circuit of said last-named controlled rectifier.

8. A control device for synchronous motors having a field-winding discharge circuit and a field-winding excitation circuit having a positive conductor and a negative conductor, said control device including a first controlled rectifier having an anode, a cathode and a gate, said anode and cathode being connected in the positive conductor of said excitation circuit and normally maintaining said excitation circuit open, a Zener diode connected at one end to, said gate at its other end to said negative conductor, said discharge circuit having two branches, a second controlled rectifier having an anode, a cathode, and a gate, said anode and cathode being connected in one of said branches to said conductors and conducting positive slip-frequency current pulses, a third controlled rectifier having an anode, a cathode and a gate, said anode and cathode of said third rectifier being connected in said second branch to said conductors and conducting negative slip-frequency current pulses, a gate circuit connected to the gate of said last-named controlled rectifier and to said negative conductor and energized by the negative slip-frequency current pulses, and a capacitor in the gate circuit of said last-named controlled rectifier.

9. A control device for synchronous motors having a field-winding discharge circuit and a field-winding excitation circuit, said control device including a semiconductor in said excitation circuit and normally inoperative to maintain said circuit open, means including a second semiconductor in said discharge circuit and dependent upon the slip-frequency of said current for causing said second semiconductor to actuate said first semiconductor, means for discharging the positive pulses of the slip-frequency current and means for discharging the negative pulses of the slip frequency current.

10. A control device for synchronous motors having a field-winding discharge circuit and a field-winding excitation circuit, said control device including a silicon controlled rectifier in said excitation circuit and normally inoperative to maintain said circuit open, means including a second silicon controlled rectifier in said discharge circuit and dependent upon the slip frequency of said current for causing said second silicon controlled rectifier to actuate said first silicon controlled rectifier, means for discharging the positive pulses of the slip frequency current and means for discharging the negative pulses of the slip frequency current, and a zero slip circuit connected across said first silicon controlled rectifier and producing positive pulses in the event that the motor pulls into step without excitation and applying said pulses to the gate of said first silicon controlled rectifier to turn on said first silicon controlled rectifier and apply excitation to the motor field winding.

11. A control device for synchronous motors having a field-winding discharge circuit and a field-winding excitation circuit, said control device including a semiconductor in said excitation circuit and normally inoperative to maintain said circuit open, a zero slip circuit connected across said semiconductor and producing a voltage in the event that the motor pulls into step without excitation and applying said voltage to said semiconductor to turn on said semiconductor and apply excitation to the motor field winding.

12. A control device for synchronous motors having a field-winding discharge circuit and a field-winding excitation circuit, said control device including a silicon controlled rectifier in said excitation circuit and normally inoperative to maintain said circuit open, a zero slip circuit connected to the anode and cathode of said silicon controlled rectifier producing a voltage in the event that the motor pulls into step without excitation and applying said voltage to the gate of said silicon controlled rectifier to turn on said silicon controlled rectifier and apply excitation to the motor field-winding.

13. A control device for controlling the operation of a synchronous motor comprising a field-winding circuit connected to a source of direct current and to the field-winding, a silicon controlled rectifier in said circuit and having a gate, control circuitry including a bridge circuit having first, second, third and fourth legs connected in sequence, a rectifier in the first leg directed toward the juncture between said first and second legs, a rectifier in said second leg directed toward the same juncture, a rectifier in said third leg directed away from the juncture between said third and fourth legs and a rectifier in said fourth leg directed away from said last named juncture, conducting means between the juncture between said first and fourth legs and one end of the field-winding, conducting means between the juncture between said second and third legs and the other end of said field-winding, conducting means between the gate of said silicon controlled rectifier and the juncture between said first named juncture, a second silicon controlled rectifier connected between said first and second named junctures and having a gate, a gate circuit connected to said gate and to the juncture between the second and third legs, and a gate resistor and a condenser in series in said gate circuit.

References Cited in the file of this patent

UNITED STATES PATENTS

| 2,425,047 | Reeves | Aug. 5, 1947 |
| 3,020,463 | MacGregor | Feb. 6, 1962 |